UNITED STATES PATENT OFFICE.

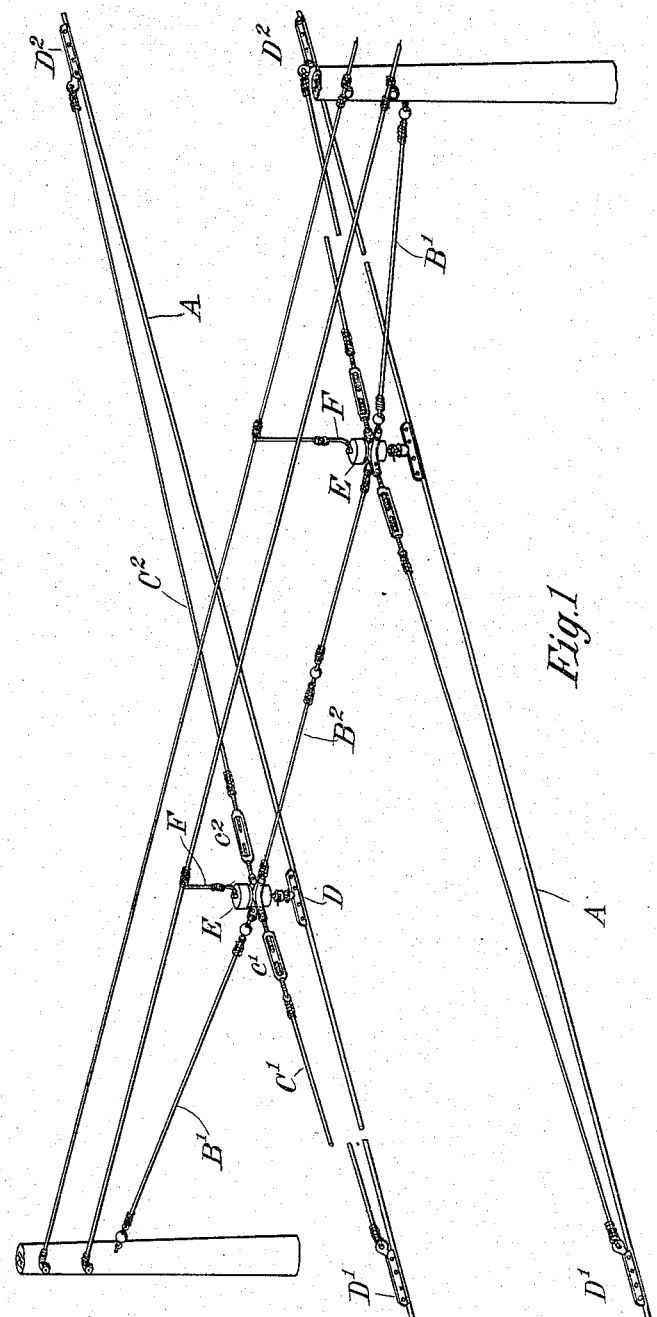

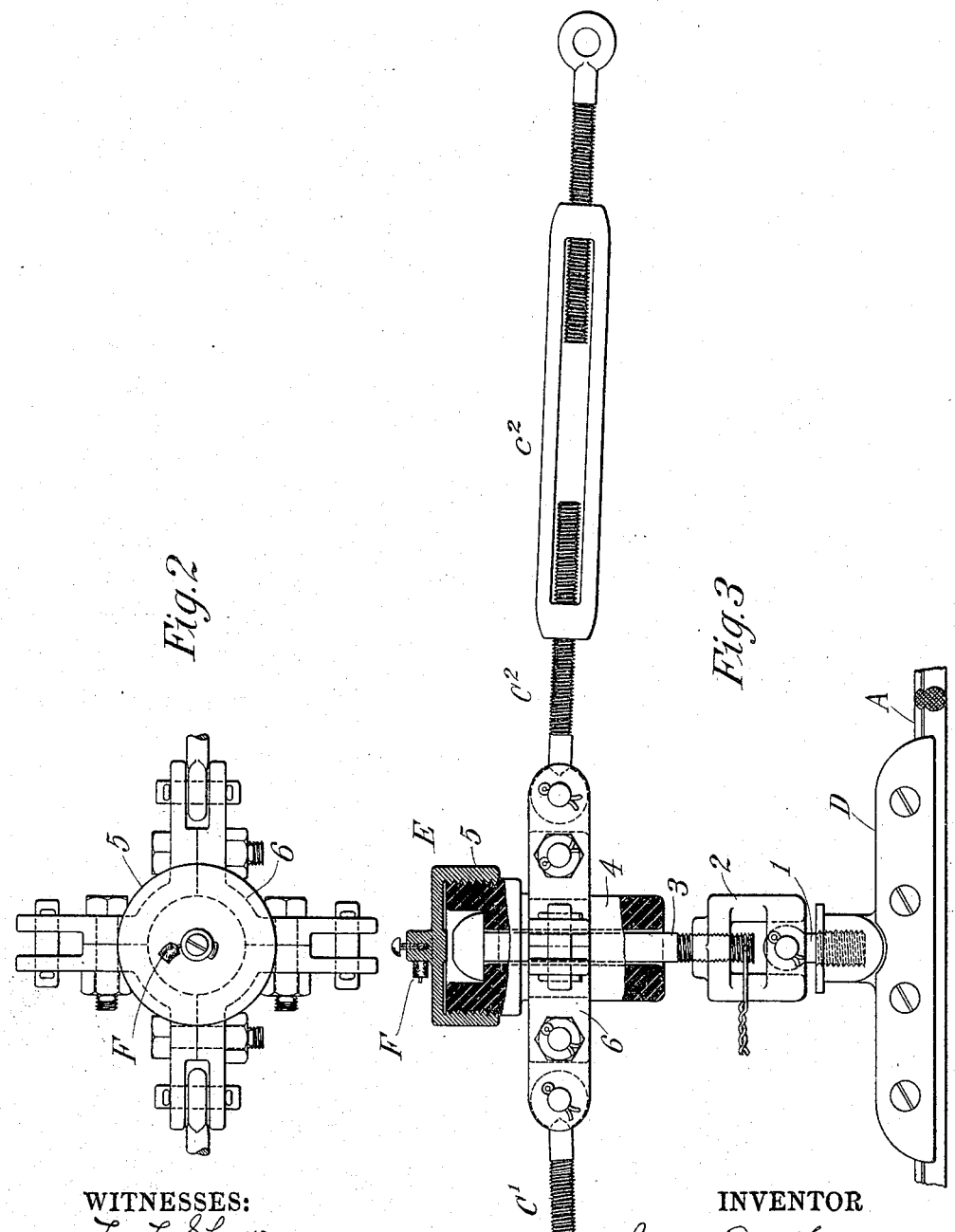

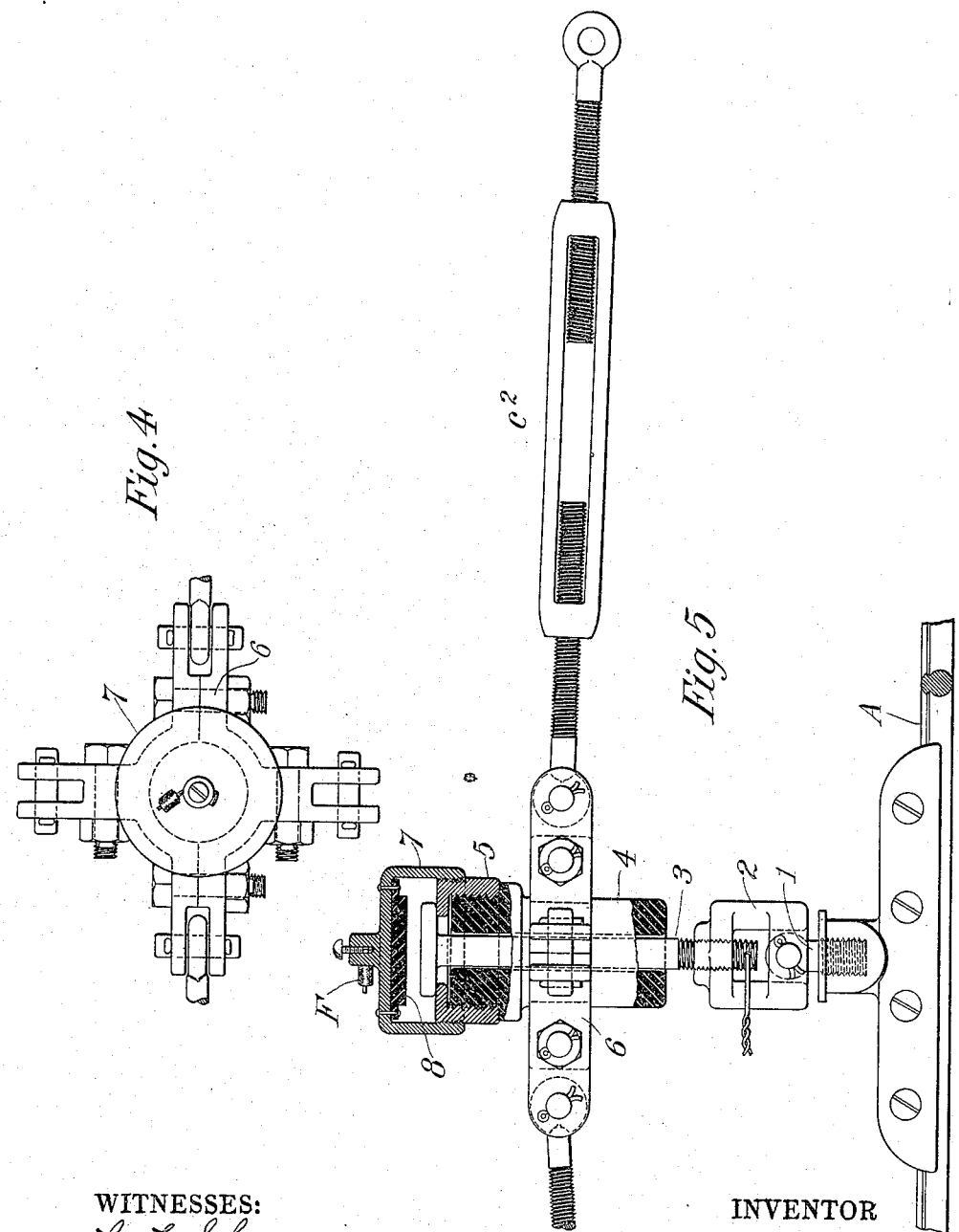

JAMES F. McELROY, OF ALBANY, NEW YORK; SUSIE H. McELROY, EXECUTRIX OF SAID JAMES F. McELROY, DECEASED, ASSIGNOR TO CONSOLIDATED CAR-HEATING COMPANY, A CORPORATION OF WEST VIRGINIA.

TROLLEY-OPERATED CONTACT.

1,176,767.     Specification of Letters Patent.     Patented Mar. 28, 1916.

Application filed April 29, 1912. Serial No. 693,912.

*To all whom it may concern:*

Be it known that I, JAMES F. MCELROY, a citizen of the United States, residing at Albany, county of Albany, State of New York, have invented certain new and useful Improvements in Trolley-Operated Contacts, the following being a full, clear, and exact disclosure of the one form of my invention which I at present deem preferable.

For a detailed description of the present form of my invention, reference may be had to the following specification and to the accompanying drawings, which illustrate my invention.

Figure 1 gives a general view of my device; Fig. 2 is a plan of the trolley wire suspension containing my switch contacts; Fig. 3 is a vertical section thereof and Figs. 4 and 5 are views similar to Figs. 2 and 3 of the form of my switch in which the circuit is normally closed.

My invention relates to a switch or circuit controller to be operated automatically by the passage of the trolley along the trolley wire. The purpose thereof is to either open or close a circuit which may be used for the operation of a signal or for the operation of a switch, or any other device which it is desired to operate by the passing of a trolley.

Referring to the accompanying drawings A in Fig. 1 represents two ordinary trolley wires suspended under longitudinal strains or tension in the usual manner.

E represents a suspension for the trolley wire, the same being so arranged as to contain the switch contacts that are to be operated. The insulator 4 of the said suspension is surrounded by a collar 6 to which the laterally extending span wires $B^1$ and $B^2$ are connected, while at right angles thereto are connected the guy wires or strain wires $C^1$ $C^2$ extending longitudinally in the direction of the trolley wire A and connected at their outer ends to the trolley wire by the strain ears $D^1$ $D^2$ respectively. In the strain wire $C^1$ is interposed a turnbuckle $c^1$ and in the opposite wire $C^2$ is a similar turnbuckle $c^2$. The purpose of these wires $C^1$ $C^2$ is to relieve the section of the trolley wire A included between the strain ears $D^1$ $D^2$ from the line tension on the trolley wire, and also to largely support the trolley wire at the strain ears $D^1$ and $D^2$, thereby allowing the weight of the aforesaid intermediate section to be taken by the ear D of the suspension E.

The suspension E, as appears, for instance, in Fig. 3, is composed of two parts separable from each other and vertically movable with respect to each other, which may be utilized to effect the operation of the switch contacts. One part of the suspension includes the insulator 4, the collar 6 and the contact cap 5 which is screwed over the upper end of the insulator. The other part of the suspension comprises the bolt 3, the head of which forms one of the switch contacts, the stirrup 2, the eyebolt 1 and the clamping ear D which is secured to the trolley wire A. The bolt 3 passes centrally through the insulator 4 and is free to move up and down therein to a slight extent but the head of the bolt rests upon an internal shoulder within the insulator, so that the weight of the trolley wire acting upon the bolt 3 will be sustained by the insulator. The stirrup 2, being screwed on the lower end of the bolt 3, provides for vertical adjustment and also provides for the hinging of the clamp ear D to the stirrup on an axis transverse to the line of the trolley wire. This is secured by means of the eyebolt 1 which is screwed into the ear D and jointed to the cross piece of the stirrup 2. The metal cap 5 screwed upon the upper end of the insulator 4 serves as one of the switch contacts and is therefore provided with a binding post and a wire F leading therefrom to a point where the current is to be utilized. By means of the guys or strain wires $C^1$ $C^2$ any desired percentage of the weight of the trolley wire may be transferred from the ear D to the strain ears $D^1$ $D^2$, thereby allowing the weight of the section of trolley wire between the said strain insulators to bear more or less upon the insulator E to hold the head of the bolt 3 out of contact with the cap 5. At the same time the wires $C^1$ $C^2$ will also take any desired percentage of the through tension on the trolley wire away from the aforesaid section between strain ears $D^1$ and $D^2$ and allow the upward pressure of the passing trolley to lift the said section more or less and when it reaches the ear D it will lift that ear, together with the bolt 3, and bring the head of the bolt into electrical contact with the cap 5. By hinging the ear D to the stirrup 2 the trolley is enabled to operate the bolt 3 without binding, since the tendency of the trolley to tip the ear D by lifting one end thereof as it approaches the ear and the other end thereof as it departs from the ear is taken up by the hinge and not converted into a binding strain of the bolt 3 against the insulator 4.

The construction shown in Figs. 4 and 5 is essentially the same as that shown in Figs. 2 and 3 except that it is arranged so that the lifting of the trolley wire by a passing trolley will break a normally closed circuit instead of closing a normally open circuit. For that purpose the head of the aforesaid bolt 3 passes through the cap 5 and is provided with an extended head which rests upon the top of the cap and makes contact therewith. Above the cap 5 is a tubular box 7 screwed thereon, to which the outgoing branch wire F is connected by means of a binding screw. On the under side of the cover portion of the box 7 is a block of insulation 8, against which the head of the bolt 3 may impinge when the bolt is lifted so as to avoid coming into electrical contact with the metal of the box 7. The circuit is normally closed from the trolley wire A to the branch wire F by means of the head of the bolt 3 and the cap 5 but the lifting of the trolley wire and bolt 3 by a passing trolley will break that circuit by separating the head of the bolt from the cap 5. In either case the opening or closing of the circuit by means of the trolley is but momentary, the bolt 3 dropping down to its normal position after the trolley has passed.

My arrangement provides a simple and effective mode of controlling a circuit by a trolley-operated switch. The switch contacts are inclosed within the suspension E which is similar in appearance to an ordinary trolley wire suspension, while the guy wires $C^1$ and $C^2$ are of a class of devices familiar in overhead wire constructions. Hence my device presents no unusual appearance and would hardly be distinguishable from an ordinary suspension. It also eliminates additional working parts by utilizing those parts which are necessarily present in all trolley wire suspensions as the switch-operating elements.

What I claim as new and desire to secure by Letters Patent is:

1. The combination with a trolley wire, of a suspension device comprising an insulating member provided with an electric contact, means for supporting said insulating member, elongated flexible strain devices connecting said insulating member and said trolley wire to relieve the latter from the line tension adjacent the contact, and a second contact supported by said insulating member and sustaining the weight of that portion of the trolley wire relieved of the line tension.

2. The combination with a strained trolley wire, of a suspension device comprising an insulating member provided with an electric contact, means for supporting said insulating member, elongated flexible strain devices connecting said insulating member and said trolley wire to relieve the strain from that portion of the trolley wire by which said contact is operated, means for varying the tension upon said strain devices, and a second contact supported by said insulating member and sustaining the weight of that portion of the trolley wire relieved of the line tension.

3. The combination with a trolley wire, of a suspension device comprising an insulating member provided with an electric contact, means for supporting said insulating member, spaced apart elongated flexible supports connecting said insulating member and said trolley wire to relieve the latter from the line tension adjacent the suspension device and a second contact supported by said insulating member and sustaining the weight of that portion of the trolley wire relieved of the line tension.

4. The combination with a trolley wire, of a suspension therefor comprising an insulating member provided with a contact, and a movable member supported thereby and also provided with a contact, means for supporting said suspension, and means connected with one of said members for relieving the wire of the line tension adjacent said suspension, the other member of said suspension being connected to and sustaining that portion of the trolley wire relieved of the line tension.

5. The combination with a trolley wire, of a suspension therefor comprising an insulating member provided with a contact, and a movable member supported thereby and also provided with a contact, means for supporting said suspension, and means connecting one of said members to the trolley wire at two separate points to relieve the wire of the line tension adjacent said suspension, the other member of said suspension being connected to and sustaining that portion of the trolley wire relieved of the line tension.

6. The combination with a trolley wire, of a suspension therefor comprising an insulating member provided with a contact, and a movable member supported thereby and also provided with a contact, means for supporting said suspension, and means connected with one of said members for relieving the wire of the line tension adjacent said suspension, an ear extending longitudinally of the wire and connected to that portion of the latter relieved of the line tension, and an intermediate device between said ear and the movable member of said suspension, and hinged to the latter on an axis transverse to the trolley wire.

7. The combination with a trolley wire, of a suspension therefor comprising an insulating member and a movable member guided by said insulating member and connected with said wire, two electric contacts one carried by the insulator, the other carried by the movable member, a support for the suspension, and supplementary supports for the trolley wire on either side of said suspension.

8. The combination with a trolley wire, of a two-part suspension therefor the two parts being movable with respect to each other, a transverse span wire for supporting one of the said parts, the other part supporting the trolley wire, elongated flexible, longitudinally disposed strain wires attached to the trolley wire and extending oppositely from said insulator to relieve said trolley wire of the line tension adjacent said suspension, and inclosed contacts operated by the relative movement of the two parts of the suspension.

9. A combined trolley wire suspension and switch comprising an insulator, a support therefor, a vertical stem passing movably through said insulator and having a rocking supporting connection for the trolley wire, a cap forming an inclosure on said insulator and a switch contact in said inclosure operated by said stem.

10. The combination with a trolley-wire insulator, of a support therefor, and three trolley wire supports sustained by said insulator and between the latter and the trolley wire, the central support of the three being movable with respect to the insulator, and contacts operated by the said central support.

11. The combination with a trolley wire under tension of an elongated, longitudinally disposed guy or strain wire spanning a section of the trolley wire to relieve the latter of the line tension, and electric contacts operated by the movement of said relieved section with respect to the guy or strain wire.

12. The combination with a trolley-wire insulator provided with a contact, of a movable supporting stem for the trolley wire passing through said insulator and longitudinally movable therein, and also provided with a contact.

13. The combination with a trolley wire insulator provided with a contact, of a movable supporting stem for the trolley wire passing through said insulator and longitudinally movable therein and also provided with a contact, and an ear hinged to said stem on an axis extending transversely of the trolley wire.

14. The combination with a trolley wire of a two-part suspension therefor, contacts operated by the relative movement of the parts of said suspension, means for applying the weight of the trolley wire to one of said contacts, and adjustable means for relieving said contact of a portion of the weight of the trolley wire.

15. The combination with a strained trolley wire, of a two-part suspension therefor one part supported externally and the other part connected with the trolley wire, an electric contact operated by the relative movement of said parts and means for modifying the line tension of the trolley wire acting on the said contact.

16. The combination with a strained trolley wire of a two-part suspension therefor, the two parts being movable with respect to each other, an electric contact operated by their relative movement, an external support for one part, a connection between the other part and the trolley wire and means for adjusting the line tension of the trolley wire applied for the operation of the said contact.

17. The combination with a strained trolley wire of a two-part suspension therefor comprising a stationary member and a second member movable with respect thereto, each of said members having a contact, a support for said stationary member, and a double connection between said stationary member and the trolley wire one connection including the other part of the suspension and the other connection including a tension relieving device whereby a portion only of the weight of the trolley is utilized to operate the contact.

18. A trolley operated contact comprising a suspension comprising two members one of which is provided with a fixed contact, the other member being movable and provided with a contact that engages the fixed contact, means for hinging the movable part of the suspension to a trolley wire on an axis extending transversely of the latter, and adjustable elongated flexible strain connections between the movable part of the suspension and the trolley wire at points distant from said hinge connection with the trolley wire.

In witness whereof I have hereunto set my hand, before two subscribing witnesses, this 26th day of April, 1912.

JAMES F. McELROY.

Witnesses:
HERBERT A. CAULKINS,
FREDK. C. MANNING.

Copies of this patent may be obtained for five cents each, by addressing the "Commissioner of Patents, Washington, D. C."